April 22, 1958 G. D. HENDRICKS ET AL 2,832,060

REPLACEMENT OF A PLURALITY OF CHANNELS BY A SINGLE CHANNEL

Filed Sept. 2, 1953 5 Sheets-Sheet 1

INVENTORS.
G. DONALD HENDRICKS
FRANK ARTHUR PEARSON
GEORGE LELAND RAMBO

Bruno C Lechler, Atty.

INVENTORS.
G. DONALD HENDRICKS
FRANK ARTHUR PEARSON
GEORGE LELAND RAMBO
Bruno Lichler Atty

REPLACEMENT OF A PLURALITY OF CHANNELS BY A SINGLE CHANNEL

Filed Sept. 2, 1953 5 Sheets-Sheet 3

INVENTORS.
G. DONALD HENDRICKS
FRANK ARTHUR PEARSON
GEORGE LELAND RAMBO

Bruno Lechler, Atty.

INVENTOR.
G. DONALD HENDRICKS
FRANK ARTHUR PEARSON
GEORGE LELAND RAMBO
Attorney

INVENTOR.
G. DONALD HENDRICKS
FRANK ARTHUR PEARSON
GEORGE LELAND RAMBO
Bruno C. Lechler
Attorney United States Patent Office 2,832,060

Patented Apr. 22, 1958

2,832,060

REPLACEMENT OF A PLURALITY OF CHANNELS BY A SINGLE CHANNEL

George Donald Hendricks, Campbell's Island, and Frank Arthur Pearson and George L. Rambo, Moline, Ill., assignors to Eagle Signal Corporation, Moline, Ill., a corporation of Massachusetts Application September 2, 1953, Serial No. 378,057

7 Claims. (Cl. 340—35)

The invention relates to a method and apparatus that permits reducing the number of channels required between a master controller, or central control point, and independently operating, local controllers. Each of these local controllers may be able to control the operation of some apparatus without assistance from other controllers according to any one of several patterns of operation. The master controller, however, has the power of selecting one of the patterns according to which the local controllers will then operate.

Frequently the distance between the master controller and the local controllers is very great and a plurality of channels are required between the master controller and each local controller. Often ten or more channels are required; the installation is costly and the maintenance of such an interconnecting system is a serious problem.

The invention applies to the replacement of a plurality of channels each one of which can be energized, by a single channel conveying various signals. The invention applies to channels energized in any manner—mechanically, hydraulically, electrically, by radio, by induction currents. The signals sent over the single channel need not be energized in the same way. Thus the channels that are replaced may be energized mechanically and the single channel may be energized by radio current.

By way of illustration only, not by way of limitation, the invention will be illustrated as applied to a system containing master and local controllers of the types now in use in which a plurality of channels, electrical conductors in this case, run from the master controller to each of the local controllers. These channels will be referred to as 'wires' in this illustration though it will be understood that the invention would apply equally if these wires were channels of any sort conveying energy of any type when energized.

The single channel will be illustrated by a conductor, and, in a modification, by a radio channel. It will be obvious that if a power line, or any other wire such as a telegraph wire were available, a carrier current could be superimposed on that line without interfering with its primary function and this carrier current could be modulated and the modulations could actuate the selector in the manner described herein.

In general, the invention contemplates running the plurality of wires leading out from the master controller to a nearby translator. The function of the translator is to respond to signals received over any one of the plurality of wires by sending out a coded signal that is indicative of that particular wire.

These coded signals, each representing one of a number of wires leading into the translator, are transmitted over a single channel to each of the local controllers.

Since the local controllers are designed to receive signals over a number of wires, each of which would normally run back to the master controller, it is necessary to interpose a selector ahead of each local controller. The function of the selector is the reverse of that of the translator—it receives a coded signal, identifies the wire represented by that signal, and sends current over that wire into the local controller, which will then function in its usual manner. Since the resetting of the master controller to put current on one wire also takes current off another wire that was previously energized, the selector must not only select the wire but it must also provide current for this wire.

In the modified form the invention permits selecting one of several wires in one group, placing current on that wire, taking current off other wires in that group that had previously carried current, all without disturbing the wire that is energized in another group.

The object of the invention is to provide a method whereby one channel will replace a number of channels between a master controller and a local controller.

The object of the invention is also to provide a method whereby one channel will serve to select at a distant location the proper channel from a number of channels and place thereon energy from a local source available at the distant location.

The object of the invention is also to provide a method whereby one channel will serve to select the proper channel at a distant location from a number of channels and place energy thereon from a local source and take the energy off whatever channel was previously energized.

The object of the invention is also to provide a method wherein one channel will serve to select the proper channel in one of several groups of channels and place energy thereon from a locally available source and take the energy off whatever wire in that group of channels that was previously energized without disturbing the flow of energy over channels in other groups.

The object of the invention is to provide a method wherein one channel will serve to select the proper wire out of one of several groups and place energy thereon from a local source and take the energy off whatever wire in that group was previously energized without disturbing the wires in other groups and periodically modifying the flow of current over the selected conductor.

The object of the invention is to provide a method whereby one radio channel carrying coded signals replaces a number of wires between a master and a local controller.

The object of the invention is also to provide a translator which will receive signals over one of a number of conductors and send out a coded message over a single channel which will identify the wire over which the translator received its signal.

The object of the invention is also to provide a translator which will receive signals over one of a number of conductors and send out a coded message over a single channel which will identify the wire over which the translator received its signal, the coded message consisting only of a number of signals all of one type or tone and varying only in length.

The object of the invention is also to provide a translator which will receive signals over one of a number of wires and send out a coded message over a single channel which will identify the wire over which the translator received its signal and place current thereon at a distance location from a local source wherein the coded message consists of a number of short signals that identify the wire and a long signal that places current on the wire selected.

The object of the invention is also to provide a translator which will receive signals over one of a number of wires and send out a coded message over a single channel which will identify the wire over which the translator received its signal and place current thereon at a distance location from a local source wherein the coded message consists of a number of short signals that identify the wire and a long signal that places current on the wire selected and which will in addition transmit a periodic isolated long signal that affects the flow of current over the wire that has been selected.

The object of the invention is also to provide a selector which will respond to a coded message consisting of a succession of short and long pulses and place current on the proper wire.

The object of the invention is also to provide a selector which will respond to a coded message consisting of a succession of short and long pulses and place current on the proper wire and remove the current from one of a group of wires that was previously supplied with current.

The object of the invention is also to provide a selector which will actuate one device in response to a succession of short signals, another device in response to a long signal following short signals.

The object of the invention is also to provide a selector which will actuate one device in response to a succession of short signals, another device in response to a long signal following short signals, and still another device in response to a long signal not accompanied by short signals.

The object is also to provide a selector in which an arm, responding to a succession of short signals, selects a wire; another device, in response to a long signal following the short signals supplies current to the selected wire from a local source; the current applied to the wire closes a relay that closes a maintaining circuit for that relay and opens the relays connected to any other wire of a group; and applies local current steadily to a local controller thru the wire thus selected; and after the wire is selected the arm is moved back to its initial position.

A further object is to provide a selector of the type just described wherein a single long pulse, not accompanied by short pulses, will not disturb the selection of a wire made but will temporarily interrupt the steady flow over the selected wire.

Figure 11:
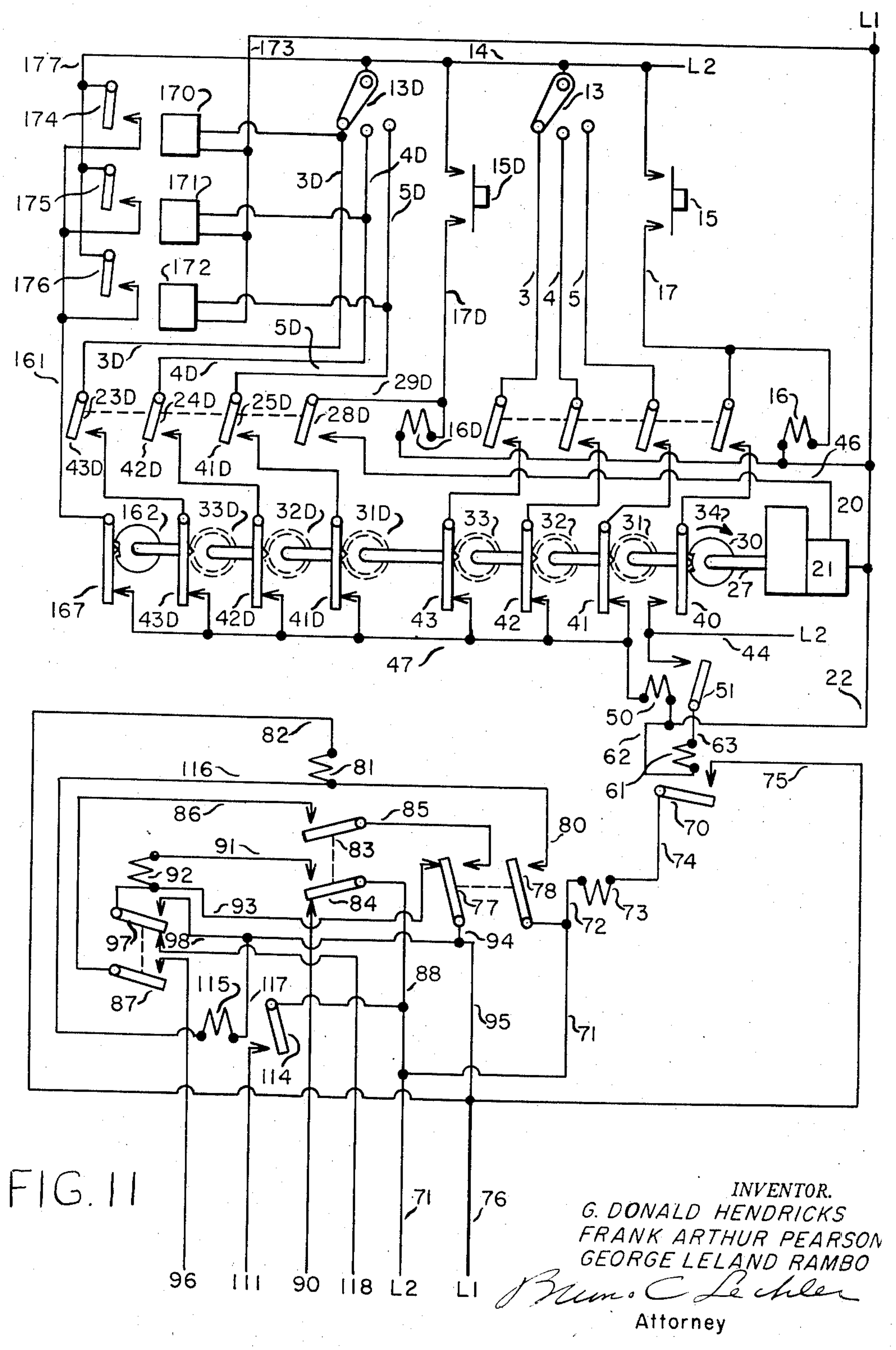
Figure 12:
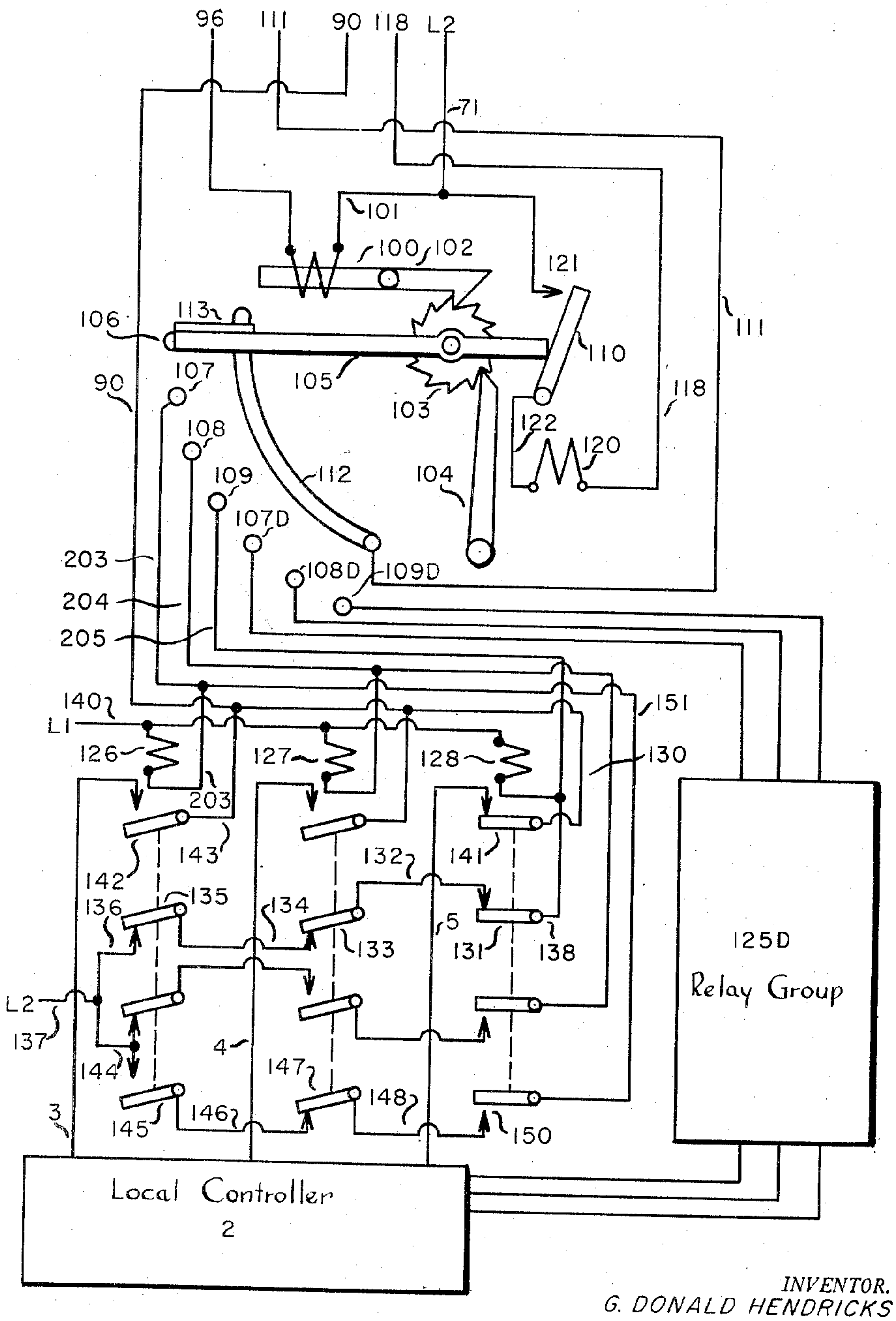

Figures 11 and 12, placed end to end, show the circuits shown in Figures 1 to 10 combined to form one typical form of the invention.

Figures 1, 2, 3, 7:
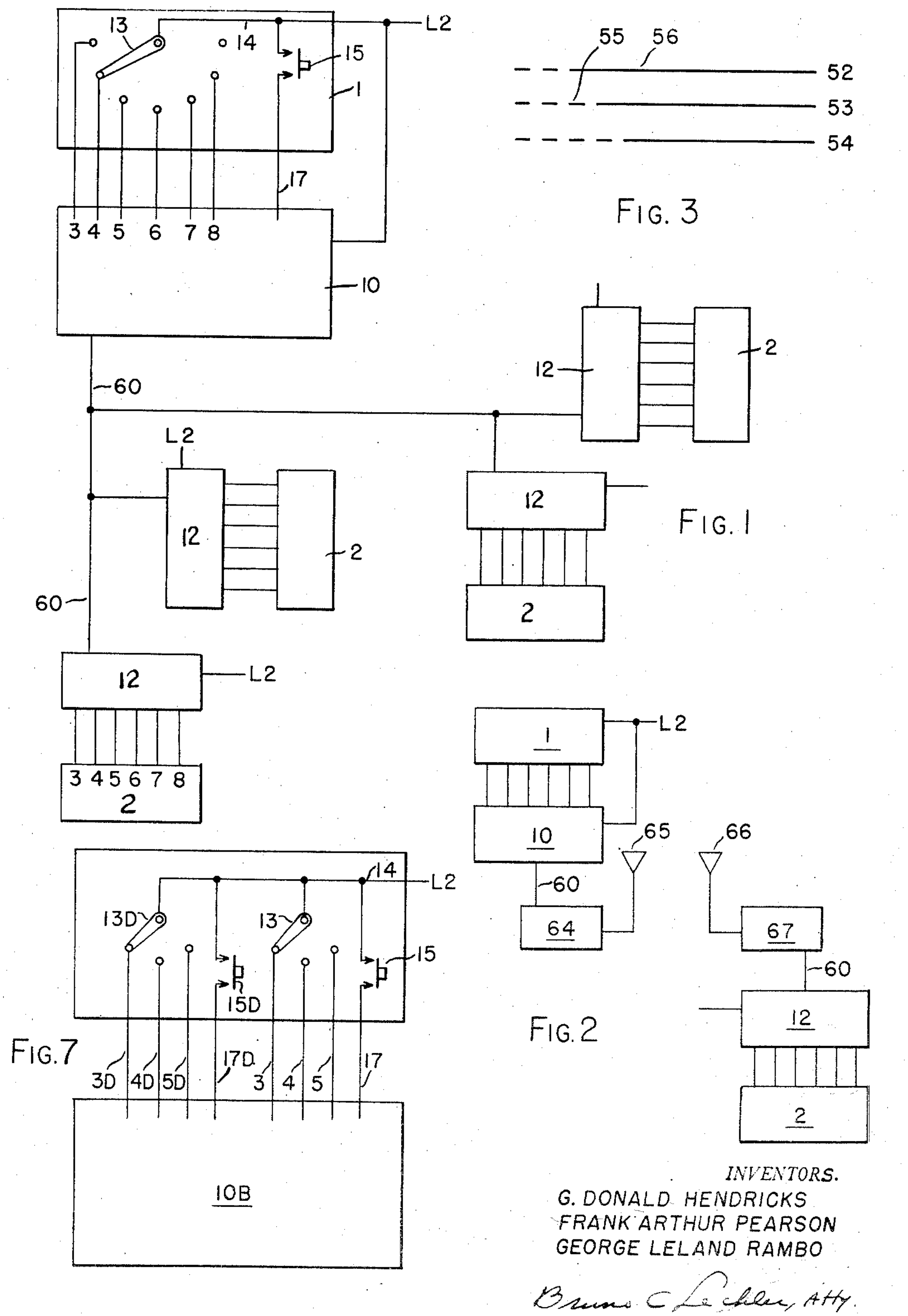
Fig. 1 shows the typical system, diagrammatically, in which a master controller controls the operation of a number of widely scattered local controllers.
Fig. 2 shows a modification of the system wherein the single channel consists of a radio frequency.
Fig. 3 shows the types of signals sent over the single channel.
Fig. 7 shows a modified form of the master controller.

Referring more particularly to Fig. 1, 1 indicates a master controller and 2 a local controller. 3, 4, 5, 6, 7, 8 indicate individual wires or channels normally leading from the master controller to each local controller. Thru these channels the controller is shifted over to operate in accord with another one of several patterns.

In the basic form of the invention, wires which normally lead from the master controller to the local controllers lead only to a translator 10 and a single channel 60 leads from the translator to each of the selectors that put current on the proper one of the wires 3 to 8, feeding into the local controller. The local controller controls some other apparatus not shown. By way of illustration only, and not by way of limitation, the master controller may control the traffic in a city through local controllers located at the various street intersections. Each of these local controllers, supplied by current from a local source of power L2 controls the signal lights and/or other functions at that particular street intersection.

The wires that lead from the master controller end at a translator 10 that sends coded signals over a single channel 60 to a selector 12 located near each local controller. The selector, 12, thru wires 3–8 sends the proper current to local controller 2.

The call for another pattern of operation at the local controller that is issued by the master controller may be in response to a manual act or in response to some automatic apparatus. By way of illustration only, a manually operated switch 13 is shown in the master controller, feeding current from L2 thru line 14 to the switch and thence to one of the wires 3–8. As the switch is moved to contact a new wire, current is removed from the old wire. To avoid a confusion of signals, should the switch 13 be on wire 6 and the next wire to be energized is 3, which calls for passage of the switch over all the intermediate wires, the translator will not transmit a signal until the switch 13 has reached its new position at wire 3 and the button 15 is actuated.

Figures 4, 8:
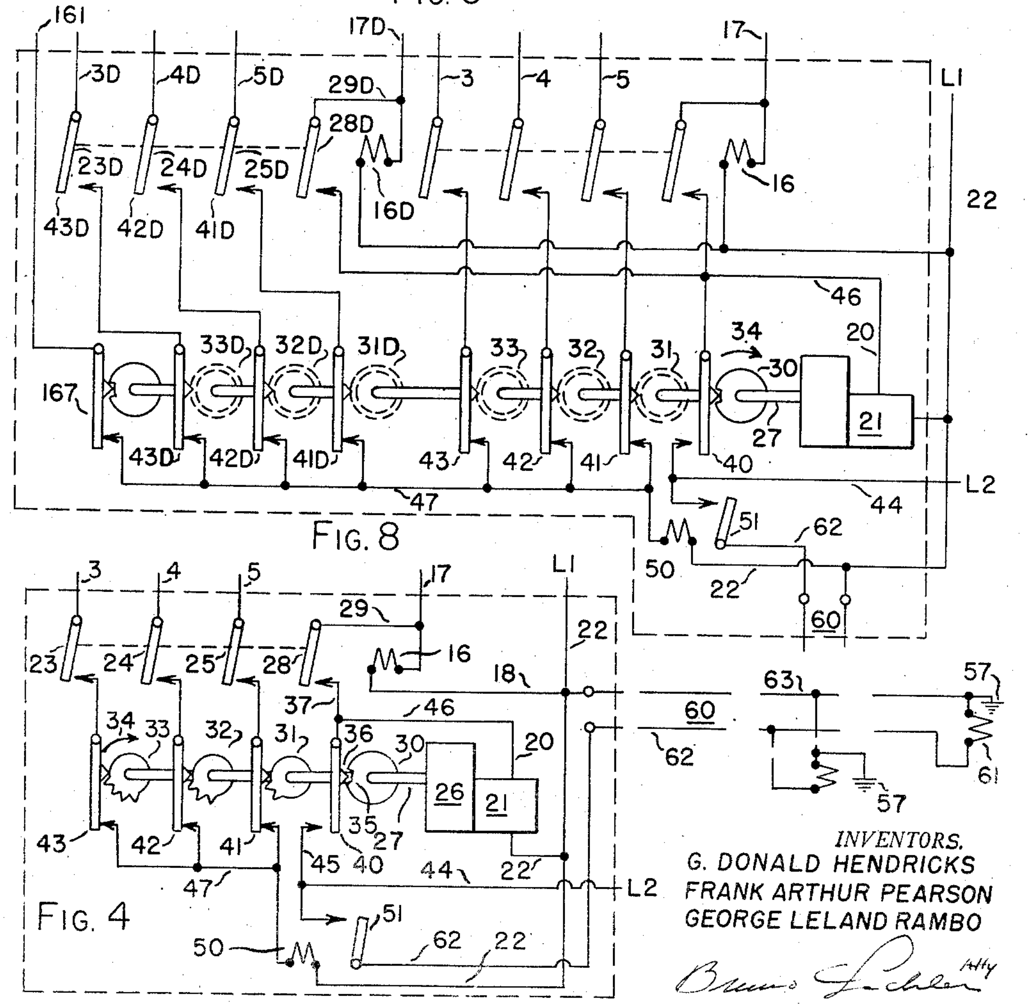
Fig. 4 shows diagrammatically a translator designed for use on a system having three channels.
Fig. 8 shows a modified form of the translator adapted for use with either of the modified master controllers shown in Figures 7 and 10.

A translator is shown in greater detail in Fig. 4. There can be any number of wires leading to the translator. Since each additional wire merely means an additional cam and switch in the translator, the translator used for illustration is shown with only three wires—3, 4, 5. However there could be any number of wires. Each of the three wires, 3, 4, 5 leads to an open switch 23, 24, 25. The three switches 23, 24, 25 as well as the switch 28 are all held closed as long as relay 16 is energized. When starting button 15 is energized, current flows from L2 thru wires 14, pushbutton 15, line 17, thru relay 16 and thru line 18 to L1. This closes the four switches 23, 24, 25, 28. Current now flows from line 17 thru line 29, switch 28, lines 37, 46 and 20 to motor 21 and thence thru line 22 to L1. Motor 21, which may be a synchronous motor thru gearing contained in housing 26, turns shaft 27 at a slow speed. This shaft carries circular cams 30–33 each of which controls the position of one of the switches 40–43. The shaft turns in direction 34. Cam 30 has a notch 35. In the position shown follower 36 on switch 40 rests in the notch 35. The switch is normally open and no current is flowing from L2 over wires 44, 45, switch 40, line 46 to line 20, motor 21 and line 22 to L1.

As indicated, pressing starting button 15 puts current on the motor 21 and as soon as the shaft 27 has been turned thru a small angle the cam 30 will force the follower 36 out of notch 35 and close the switch 40. This completes the circuit just described and a holding circuit is established. The motor will run until the shaft has made a full revolution, again allowing the follower to fall into the notch even though the button 15 has been released earlier. Not only will the motor cause the shaft to make a full revolution, but the maintaining current fed thru switch 40, line 37, switch 28, lines 29 and 17 will hold the relay 16 energized and the switches 23, 24, 25 and 28 closed. Only that one of these switches connected with the wire that has been energized by switch 13, that is wire 4 in the illustration, is carrying current. Switches 41, 42, 43 are normally closed, so that as soon as the relay 16 closes, current flows thru line 47 to sending relay 50 and line 22 to L1.

Sending relay 50 closes switch 51 which puts current from L2 thru line 44 on the single channel 60. Were it not for the action of cams 31, 32, 33 the switch 51 would remain closed until cam 30 has made one revolution removing the maintaining current on relay 16 which opens switches 23, 24, 25. However, each of the cams 31, 32, 33 has a different number of teeth. Thus cam 31 has two teeth. As this cam rotates, each tooth engages the follower on the switch 41 interrupting the flow of current twice during the revolution of the shaft. This causes the coded message 52 shown in Fig. 3 to be sent. The next cam 32 may have three teeth and this will cause switch 42 to be opened three times and coded message 53 to be sent. There may be any number of additional cams on shaft 27 and each will have a different number of teeth on the cam so that a different signal will be sent characteristic of the particular wire energized.

It will be noted that the total time covered by each of the signals 52, 53, 54 is the same, and that each signal consists of a number of short pulses 55 and a long pulse 56.

The single channel 60 leads off to a number of distant sensitive relays 61.

This single channel is here shown as consisting of a line 62 drawing current from L2, leading from switch 51 to distant relays 61 and a return thru 63 to L1 which is, in effect, a ground.

It is clear that the single channel may consist of two wires, or it may consist of a single wire if each relay 61 leads to a ground 57 and line 63 is eliminated. It that event L1 at the translator must of course also be grounded.

As indicated in Figure 2, the single channel may be a single radio frequency and the signal may be sent over this single radio frequency channel. In that case the master controller 1, and translator 10 are as already described and the single channel 60 leads to a radio transmitter 64. The radio transmitter puts a tone on the air, over antenna 65 whenever the single channel 60 is energized.

This tone is picked up by the antenna 66 located at the selector which is attached to the radio receiver 67. The tones sent over the single channel are thus picked up and converted into a current placed on line 60 leading to the selector 12 connected to the local controller 2.

Since the single channel merely transmits one type of signal, it may consist of a wire circuit that transmits long and short pulses, or of a radio channel transmitting a single tone extending over a long or a short period as described. It is obvious that any other type of changing signal transmitted over any kind of channel could be used. Thus a voltage varying between a high and a low value, or a frequency varying between two values, could be used.

*Selector*

Figures 5, 9, 10:
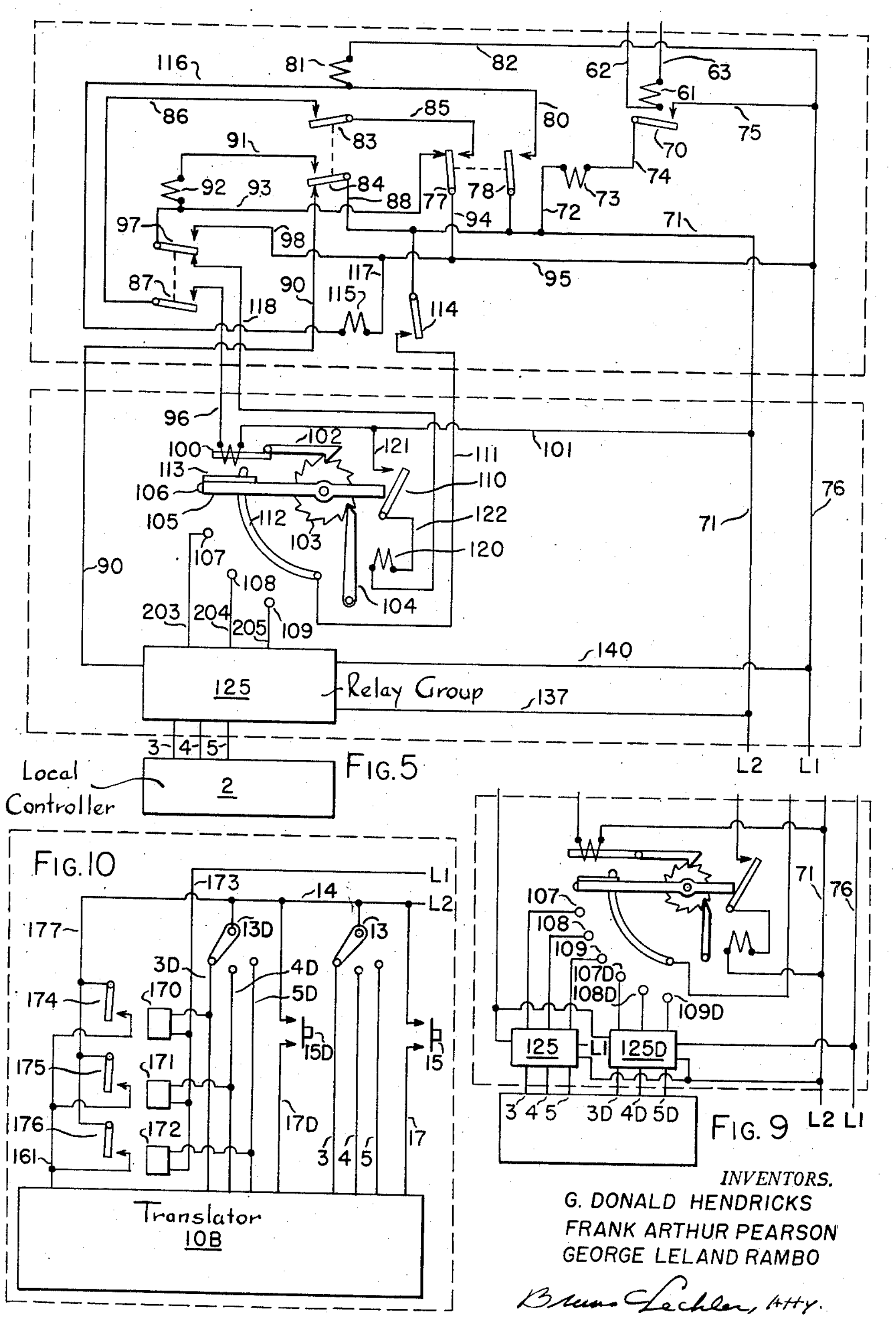
Fig. 5 shows a selector adapted for use with the translator shown in Fig. 4.
Fig. 9 shows the lower portion of a selector similar to that shown in Fig. 5 modified for use with the modified translator shown in Fig. 7.
Fig. 10 shows still another modification of a master controller.

The selector shown in Fig. 5 receives signals thru sensitive relay 61. This relay is located at the end of the single channel. Whether the single channel consists of a pair of wires, a single wire, a radio channel, or any other embodiment, the relay 61 responds to the translator. As the translator sends combinations of short and long pulses the switch 70 closes for various periods and when the entire coded message has been received, remains open.

Whenever switch 70 closes, current flows from a local power source L2 thru lines 71, 72, main relay 73, line 74, switch 70, line 75 to line 76 which leads to L1. The function of the main relay 73 is to actuate the two switches 77, 78 which carry out the decoding operation.

The normally open switch 78 closes as soon as the first impulse closes relays 61 and 73 and feeds current from L2, line 71, switch 78 to line 80, slow-release relay 81 and lines 82 and 76 leading to L1. The slow-release relay 81 will close on arrival of the first signal, but it will not release until the entire coded message has been transmitted because the intervals between pulses are too short to allow the relay to open. The two switches 83, 84 are controlled by slow release relay 81 and remain closed during the entire sending of the coded message. They accomplish two things.

Switch 83 connects switch 77 thru lines 85, 86 to the normally open switch 87 and holds this circuit to switch 87 during the entire time a coded message is being sent. Switch 84 removes power flowing from L2 over lines 71 and 88 to line 90, leading to the local controller 2 thru holding-relay group 125. It also puts power on line 91 leading to conditioning relay 92 and thence to line 93 to switch 77, which is open at that instant.

When the first pulse of the signal arrives, and relays 61, 73 close and cause relay 81 to connect relay 92 to the source of power, the circuit from relay 92 thru lines 93, 94, 95 to L1 is interrupted at the switch 77.

Thus it will be noted that the conditioning relay 92, which controls the sending of current thru line 96 to the device that selects the line extending to the local controller, which is to be energized, is not closed by the initial pulse arriving at the selector.

Thus a single pulse, whether arriving by accident, such as may result from a short circuit in the line, or transmitted by design, will close relays 61, 73, 81. However, 92, the only relay that can change the operation of the local controller, does not respond and in due course all three of the relays 61, 73, 81 will again open.

But if a true coded message consisting of at least two pulses arrives, 81 is closed on the arrival of the first signal and, with slow release relay 81 still closed, completes the circuit for relay 92 thru switch 77 and lines 94, 95, 76 to L1 that has been described when the first pulse ends. This causes relay 92 to close switches 87 and 97. Switch 97 establishes a holding circuit from L1 line 76, 95, 98 to conditioning relay 92. The current from relay 92 continues thru 91 lines 88, 71 and L2 as long as the slow release relay 81 keeps switch 84 closed.

The arrival of each succeeding pulse at the sensitive relay 61 will now close relay 73 and as the switch 77 closes, the circuit from L1, lines 76, 95, 94, switch 77, line 85, closed switch 83, line 86, closed switch 87, line 96, ratchet relay 100, lines 101, 71, to L2 is established.

The ratchet relay, responding to the arrival of each pulse after the first, will draw in the pawl 102 that engages ratchet wheel 103. This ratchet wheel is biased in a clockwise direction by a spring, not shown. A holding-pawl 104 holds the ratchet in the position to which it has been moved by the successive movements of the ratchet relay. The ratchet carries an arm 105 having an initial position 106 that is inactive, and one additional position for each of the wires in the system. In this illustration of a selector, contacts 107, 108, 109 correspond, respectively, to wires 3, 4, 5. When in its initial position, the arm 105 holds a switch 110 open. In each position other than the initial one, the arm connects line 111 thru contact strip 112 and sweeper 113 to one of the wires leading away from contact 107, 108, 109.

No current flows to line 111 until switch 114 is closed by slow-make relay 115. This relay will not be closed by a series of short pulses but when a long pulse is received, relays 61, 73, 81 and 115 all close and current now flows from L2, lines 71, 80, 116, slow-make relay 115, lines 117, 95, 76, to L1. With current now on 111, flowing to 112 and sweeper 113, the arm 105 will place current on either wires 203, 204 or 205. The short pulses have now positioned arm 105 and a long pulse has sent current over the arm. After the long pulse ceases, relays 61, 73 open immediately and as switch 78 opens the flow of current thru 80, 116, to slow-make relay 115 ceases and switch 114 opens. The contacts 107, 108, 109 are now dead. When the slow-release relay 81 opens, switch 83 opens and relay 92 also opens. Switch 97 makes contact with line 118 which energizes relay 120 to release the holding pawl 104. This circuit consists of L2, lines 101, 121, closed contact 110, line 122, relay 120, lines 118 and 93 and switch 77, lines 94, 95, 76 to L1. Current continues to flow until the arm 105 is carried back to the initial position 106 by the spring and opens switch 110. When the relay 120 opens, the holding pawl 104 is again in contact with the ratchet disc. The three wires 203, 204, 205 leaving contacts 107, 108, 109 respectively lead to a holding-relay group generally indicated by 125 and shown diagrammatically in Fig. 6. The function of the holding-relay group is to connect one of the extensions 3, 4, 5, of each of wires 203, 204, 205 (Fig. 6) to line 90 that supplies current to the wire selected and to disconnect any wire that was previously drawing current from line 90. Each of wires 203, 204, 205 leads to one of the three holding relays 126, 127, 128. One of these relays is normally held closed by a holding circuit.

Figure 6:
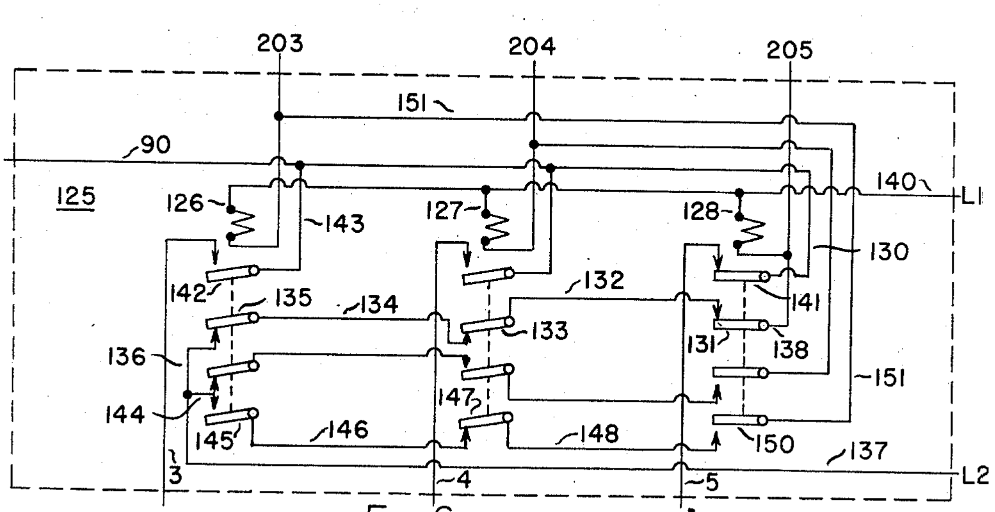
Fig. 6 shows diagrammatically a holding relay group forming part of the selector shown in Fig. 5.

Fig. 6 shows the position of the switches while no signal is being transmitted over the single channel and therefore there is no current on any of the wires 203, 204, 205. One of the holding relays, 128 in the drawing, is held closed by a maintaining circuit that was established when the arm 105 last functioned.

In the position of relays 126, 127, 128 shown, current is flowing from L2 lines 137, 136, switch 135, line 134, switch 133, line 132, switch 131, line 138, thru relay coil 128 line 140 to L1, thus holding relay 128 closed.

This holds switch 131 closed and current flows steadily from L2, line 71, in Fig. 5, line 88, switch 84, line 90 to line 130 in Fig. 6, then over switch 141 to wire 5. If as a result of a new selection of patterns of operation current is sent either thru wires 203 or 204 it flows thru either relays 126 or 127 and line 140 to L1. Either switches 133 or 135 in the circuit just described are opened and holding relay 128 now opens for lack of a holding circuit, thus cutting off the flow of current into wire 5.

Thus if current is placed on line 203, relay 126 closes, switch 135 opens, switch 142 closes. Current now flows from 90 to 143, to wire 3. A holding circuit is established from L2, line 137, line 144, switch 145, line 146, switch 147, line 148, switch 150, line 151 to line 203 thru relay 126, and line 140 to L1.

In the form of the invention thus far described all of the channels form a single group and when a new channel of this group is energized the current is taken off every other channel in the group.

In the form of the invention about to be described the channels, or wires, are divided into a number of groups and it will be shown that the invention permits the use of a single channel to put current on a freshly selected channel in one group, taking energy off other channels in the same group, but not disturbing the previously selected channel in any other group. This form of the invention is shown in Figures 7, 8, 9.

Figure 7 shows the modified form of the master controller which has two switches 13, and 13D. Each switch is independently or automatically controlled and each switch is designed to select one wire from its own associated group of wires. Each of these functions essentially as has been described. All of these wires lead to a modified translator 10B shown in Figure 8.

Comparing Figures 8 and 4, it will be seen that the translator shown in Fig. 8 consists of a plurality of units each similar to that shown in Figure 4.

Lines 3D, 4D, 5D, switches 23D, 24D, 25D, lines 17D, and 29D, switches 28D and relay 16D, switches 41D, 42D, 43D are all duplicates of the parts carrying corresponding numbers whose method of functioning has been described in connection with Fig. 2.

However, there is but one motor 21, one shaft 27, and one cam 30 controlling only one switch 40. Thus, whether the motor is started by pushing button 15 to close relay 16 or button 15D to close relay 16D, the closing of either relay will start the one motor and shaft 27. Once started, the shaft continues thru a complete revolution.

The cams, other than cam 30, are similar to the cams shown in Fig. 4. Since they are similar, the outline of the individual cams is not shown in detail. Cams 31, 32, 33 are duplicates of those having corresponding numbers in Fig. 2 but cams 31D, 32D, 33D while similar, have different numbers of teeth. All of the switches 41, 42, 43, 41D, 42D, 43D feed current into the one line 47 leading to relay 50 which actuates switch 51 to energize single channel 60. The coded messages identifying the wires 3, 4, 5, 3D, 4D, 5D are sent out as previously described over single channel 60.

Fig. 9 shows the modified lower portion of the selector shown in Fig. 5 to adapt it for use with a modified translator shown in Fig. 8. The arm, 105, now moves over the same contacts 107, 108, 109, and, in addition, over contacts 107D, 108D, 109D. The terminals 107, 108, 109 lead to lines 203, 204, 205 and these lead to holding relay group 125 which functions as before. The terminals 107D, 108D, 109D lead to similar lines that lead to an independent, similarly operating holding relay group 125D. Relay group 125D is a duplicate of holding relay group 125 as shown in Fig. 6. Since each relay group functions independently of the other, current put on one of the lines 203, 204, 205 as a result of a coded message will energize the corresponding lines 3, 4, 5 and de-energize any other one of these three lines which is carrying power. But any such change in the pattern of operation, wires 3, 4, 5 will not affect the pattern of operation of any other group of wires such as wires 3D, 4D, 5D, which form an associated group.

Thus the single channel substitution can be applied to systems in which more than one circuit is to be energized at one time as well as to the system previously described in which only one circuit at a time is to be energized. The energized wire in each associated group of wires leading to the local controller can be switched without disturbing the energized wire in the other groups of associated wires.

Still another modification of the invention is shown in Figures 10 and 8. There are times when the pattern of operation of distant controllers is to be changed from a central location, as already described, but in addition the various controllers are to be started simultaneously in their pattern of operation. This is referred to as synchronizing the local controllers with the master. The system provides for synchronizing when a signal is given by any kind of device. It is immaterial for the purposes of the invention whether the signal is given by a device responding to temperature, humidity, the passage of time, or another condition. This modification, shown in Figures 8 and 9, shows how either of the two forms already described may be adapted to synchronization.

In the master controller shown in Figure 10 one group of lines 3D, 4D, 5D also feeds current to periodic signal devices 170, 171, 172 respectively. These periodic signal devices may respond to any condition whatsoever that is associated with the proper operation of the equipment whose pattern of operation is controlled by the local controllers.

By way of illustration, not by way of limitation, the device 170 may close its switch for a short time at the end of every ten minutes. The other two devices, 171, 172, may each close their switch at the end of some other period of time.

If current is supplied to any one line such as 3D, one of these periodic signal devices 170, will also be energized. Similarly, if current is supplied to 4D or 5D either device 171 or 172 will be energized. Periodically this device 170 will close switch 174. As either switches 174, 175, 176 are closed, current flows from L2 thru lines 14, line 177, and the closed switch to line 161 which continues to translator 10B. The current fed to devices 170, 171, 172 thru either lines 3D, 4D, 5D is carried thru the common line 173 to L1. Purely by way of illustration, the periodic signal device 170 may close the switch 174 during the first two seconds of each minute. Referring to Fig. 8, it will be seen that the current entering the translator from 161 flows to line 47 thru a switch 167 that is normally closed. But if, in the event shaft 27 is revolving, the cam 162 will open switch 167 and prevent the flow of current from 161 to line 47 while signals are being sent by the switches controlled by cams 31, 32, 33, 31D, 32D, 33D. Thus a confusion of signals on the single channel is prevented by preventing the sending of periodic signals at a time when coded messages are being sent.

Whenever current is transmitted over line 161 and switch 167, it flows thru 47 and closes relay 50 continuing to L1 thru line 22. This closes switch 51 and puts a single long pulse on the single channel 60.

In this modification of the translator the single channel may transmit at regular intervals a long pulse and at infrequent intervals signals indicating the selections made by switches 13 and 13D at the master controller.

The closing of the various relays on the receipt of a coded signal consisting of short and long pulses by the selector has already been described. It remains only to trace the incidence of a single long pulse on the selector.

When the single long pulse reaches sensitive relay 61, main relay 73, slow release relay 81 will all close for the duration of the pulse. No signal can be transmitted over 96 to change the position of the selector arm, because as already explained, the first pulse only pre-conditions the relay 92 to transmit on succeeding pulses to line 96. However, the slow release relay 81 closing of the switch 84 opens the circuit that has been feeding current from L2, line 71, 88, switch 84, and line 90, to holding-relay group 125. Thus, whenever one of the devices 170, 171, 172 closes its switch, the current flowing over lines 3D, 4D, 5D into the local controller 10D is interrupted. When the interruption ceases, all the patterns of operation of all the local controllers start in unison.

In the operation of any of these modifications, there are one or more local controllers, each of which independently operates some local apparatus according to a certain pattern. This local controller is supplied with local current through line 90 which is normally in connection with a local L2 source thru the normally closed relay switch 84 in the selector.

The master controller and the local controller may be of the general type shown in Pearson Patent 2,624,793, granted January 6, 1953, wherein a number of wires lead from the master controller to the local controller.

However, a translator is placed after the master controller and a selector before each local controller and that portion of the wires between the controller and the selector is replaced by a single channel over which coded messages are sent.

If the master controller is of the type shown in Fig. 10 and 170 responds to some local condition, current is placed on line 161 and a long pulse is transmitted over single channel 60 to the selector. This causes switch 84 to interrupt the flow of current thru line 90 and the local controller is made aware of the fact by that interruption of the flow of current fed to it by the holding relay group 125 over a particular wire.

When the device 170 again opens switch 174, current again flows to the controller thru the same line.

In this manner, if the device 170 sends periodic time signals, the local controller may be arranged to pause or start up a pattern of operation on which it is proceeding in synchronism with the one device 170.

When conditions call for a change of the pattern of operation, such as a change in the traffic flow at a given time of day, the switch 13 or 13D is moved to indicate the changed pattern of operation by the local controller that is desired. This may be done manually or automatically. In either case, when the movement of the arm 13 or 13D is completed and pushbutton 15 or 15D actuated, the translator sends out a coded message consisting of several short and a long pulse, over a single channel. This single channel may consist of one wire, or two wires, of a radio frequency reserved for this system, or of radio signals superimposed on an existing system primarily provided for transmitting other messages. The pulses may be an interrupted current, but they may also consist of a change in the voltage fed out, or in the frequency of a current. But in any event, there will be long and short periods during which the changed conditions on the single channel will not vary.

A selector 12, placed ahead of each local controller, responds in a different manner to a long isolated signal, to a succession of short signals, and to a long signal following a succession of short signals.

The coded message sent out by the translator consisted of a series of short pulses followed by a long pulse that indicates which of the wires leading out of the master controller was selected by switch 13. Then, on continuation of the long pulse current is fed thru the arm 105 to a group of holding relays 125 and one of these puts current on one of a group of wires leading to the local controller and takes the current off the wire that previously received current.

The wire that receives the current is in effect a continuation of the wire that left the controller and which was energized by the switch in the controller. The wire from which current is removed is, in effect, the wire that is a continuation of the wire leading out of the controller from which current was removed by changing the position of the master controller switch 13, 13D.

The pattern of operation of the local controller is now changed in the same manner as it would have changed if one of the group of wires usually connecting the master controller to the local controller had been given current and the current removed from the wire that previously carried the current.

We claim:

1. A selector having a sensitive relay feeding current from a local source to a slow-make and a slow-release relay during each pulse received over a single channel, a slow-release relay remaining closed during the receipt of an entire combination of short and long pulses, a holding relay closed by current only after the completion of the first pulse and the initiation of the next pulse, a positioning relay receiving current at each pulse after the first over three switches controlled respectively by said sensitive relay, slow-release, and said holding relay, an arm moved one step to a new contact by each pulse transmitted to the positioning relay, a switch closed only on the arrival of the long pulse which closes the slow-make relay which supplies current over said arm to a particular line.

2. A selector having a sensitive relay feeding current from a local source to a slow-make and a slow-release relay during each pulse received over a single channel, a slow-release relay remaining closed during the receipt of an entire combination of short and long pulses, a holding relay closed by current only after the completion of the first pulse and the initiation of the next pulse, a positioning relay receiving current at each pulse after the first over three switches controlled respectively by said sensitive relay, slow-release, and said holding relay, an arm moved one step to a new contact by each pulse transmitted to the positioning relay, a switch closed only on the arrival of the long pulse which closes the slow-make relay which supplies current over said arm to a particular line, a circuit closed by release of the slow-release relay to allow the arm to assume its initial position.

3. A selector having a sensitive relay feeding current from a local source to a slow-make and a slow-release relay during each pulse received over a single channel, a slow-release relay remaining closed during the receipt of an entire combination of short and long pulses, a holding relay closed by current only after the completion of the first pulse and the initiation of the next pulse, a positioning relay receiving current at each pulse after the first over three switches controlled respectively by said sensitive relay, slow-release, and said holding relay, an arm moved one step to a new contact by each pulse transmitted to the positioning relay, a switch closed only on the arrival of the long pulse which closes the slow-make relay which supplies current over said arm to a particular line, a circuit closed by release of the slow-release relay to allow the arm to assume its initial position; a relay on each of said lines, circuits closed by current applied to a particular line to lock that relay and release the relay on other lines and feed current continuously out over a particular line leading to the local controller.

4. A device for the selecting of one of a number of contacts, comprising, a ratchet wheel, an arm carried by the ratchet wheel, contacts closed by said arm on each except its initial position, a ratchet relay for stepping the wheel in one direction, a holding-pawl retaining the ratchet wheel in the position to which the ratchet relay has moved it, a slow-release relay that remains closed during a succession of short pulses in the circuit leading to the ratchet relay, a switch closed by a circuit which is closed by the opening of said slow-release relay that actuates a relay that releases said holding-pawl to allow the arm to return to its initial position, and a switch in said last named circuit opened by the arrival of the arm at its initial position.

5. In a system where a single channel replaces a number of channels leading to different apparatuses and also one other channel controlling current flow over the selected channel, a translator having a number of incoming channels, a normally open relay having a separate normally open switch in each channel except the one other channel, a normally closed switch on each channel located beyond said normally open switches, a separate cam adapted to open the closed switch of each of the number of channels, a different profile on each cam, a motor driven shaft on which all of the cams are mounted, means for simultaneously starting the motor and closing the relay, a holding circuit established by the initiation of the rotation of the shaft for both the relay and the motor that is terminated when the shaft and the cams have made a complete revolution, a signal-sending device sending out a succession of short and long tones over a single channel (60) depending on the profile of the cam actuating a switch on any one of the number of channels that was energized, a line connecting the one other channel to the signal-sending device, a normally closed switch in said line, a cam on said shaft opening said switch during substantially the entire time the shaft is making a revolution to prevent interruptions of the signals descriptive of any channel sent out by the device by signals coming over the one other channel.

6. In a traffic control system adapted to control the traffic flow at a number of street intersections according to a selected time cycle and correlated patterns of operation at all the intersections, in combination, a master controller at a central station, a translator adapted to formulate a coded signal, a group of wires A leading from said master controller to said translator each wire capable of being energized by the master controller to determine the particular form of the first portion of the signal which the translator will send out, a group of wires B leading from said master controller to said translator each one capable of being energized by the master controller to determine a particular form of the second portion of the signal which the translator will send out, a single channel over which said coded signal is transmitted leading from the translator to all street intersections, a code responsive selector at each street intersection, a wire corresponding to each one of the wires in group A and group B leading from said selector, a local controller to which said wires lead and which continues to operate from local current on whatever cycle and pattern of operations were last selected, means in the local controller responsive to the activation of one of the wires corresponding to group A coming from the selector to change the cycle length and to the activation of one of the wires corresponding to group B coming from the selector to change the pattern of operation, traffic signals at each intersection controlled by said local controller.

7. In a traffic control system adapted to control the traffic flow at a number of street intersections according to a selected time cycle and correlated patterns of operation at all the intersections, in combination, a master controller at a central station, a translator adapted to formulate a coded signal, a group of wires A leading from said master controller to said translator each wire capable of being energized by the master controller to determine the particular form of the first portion of the signal which the translator will send out, a group of wires B leading from said master controller to said translator each one capable of being energized by the master controller to determine a particular form of the second portion of the signal which the translator will send out, a single channel over which said coded signal is transmitted leading from the translator to all street intersections, a code responsive selector at each street intersection, a wire corresponding to each one of the wires in group A and group B leading from said selector, a local controller to which said wires lead and which continues to operate from local current on whatever cycle and pattern of operations were last selected, means in the local controller responsive to the activation of one of the wires corresponding to group A coming from the selector to change the cycle length and to the activation of one of the wires corresponding to group B coming from the selector to change the pattern of operation, means responsive to a synchronizing signal sent by the master controller over said single channel and said selector to interrupt for a short interval the supply of local current to the local controller to synchronize the local controller in its operation according to a pattern of operation determined by the particular wire B that was supplied with current, traffic signals at each intersection controlled by said controller.

References Cited in the file of this patent

UNITED STATES PATENTS

| | | |
|---|---|---|
| 747,070 | Hood | Dec. 15, 1903 |
| 917,916 | Watson | Apr. 13, 1909 |
| 1,702,423 | Wensley | Feb. 19, 1929 |
| 1,708,989 | White | Apr. 16, 1929 |
| 1,709,067 | Field | Apr. 16, 1929 |
| 1,814,524 | Nelson | July 14, 1931 |